April 22, 1930.  M. J. B. BARBAROU  1,755,804

SPEED CHANGING AND REDUCING GEAR FOR AEROPLANE ENGINES

Filed June 4, 1929

Marius Jean-Baptiste Barbarou
INVENTOR.

By [signature]
his Attorney.

Patented Apr. 22, 1930

1,755,804

UNITED STATES PATENT OFFICE

MARIUS JEAN-BAPTISTE BARBAROU, OF PARIS, FRANCE

SPEED CHANGING AND REDUCING GEAR FOR AEROPLANE ENGINES

Application filed June 4, 1929, Serial No. 368,402, and in France March 12, 1929.

The present invention relates to epicyclic reducing gears and it has for its object to provide an epicyclic speed reducing gear which is adapted to provide for two gear ratios, such gear being particularly intended for use with aeroplane engines fitted with an over-feeding device by which the driving torque will remain practically constant.

It has been observed that the power consumed by the propeller varies according to the altitude, and at each altitude there corresponds a certain speed of the propeller affording the optimum efficiency. For the purpose of obtaining as far as possible this optimum efficiency, the epicyclic gear according to the invention permits changing of the gear ratio between the propeller and the engine beyond a certain altitude.

In a known epicyclic gear, the power is transmitted to a stationary central pinion which engages suitable flutings formed in the casing, by a rotary toothed annulus, secured to the crankshaft through the medium of planetary pinions mounted on a disc secured to or integral with the propeller shaft.

The present invention has for a further object improvements in epicyclic gears of this type for the purpose of providing for two different speed ratios, whereby the efficiency of the propeller will be increased.

According to a feature of the invention, the central pinion, instead of being in direct engagement with the gear casing, meshes with an intermediate member adapted to be connected either with the gear casing or with the rotary annulus.

When said intermediate member engages the casing, the speed is reduced between the engine and the propeller, and, when it is brought into engagement with said annulus the power is transmitted by direct drive.

This axial movement of the intermediate member from one position to the other may be controlled by the pilot, for instance by the use of oil pressure furnished by the engine lubricating pump, or by any other suitable means; the speed change preferably takes place when the engine is running at slow speed, in order to afford a smooth engagement of said intermediate member either with the gear casing or with the rotary annulus.

Figure 1:
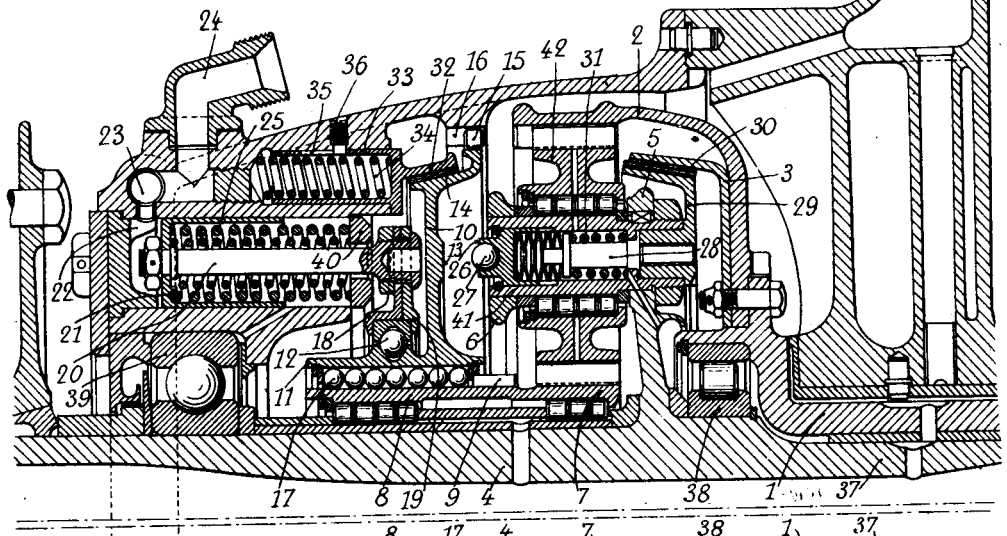
Figure 1A:
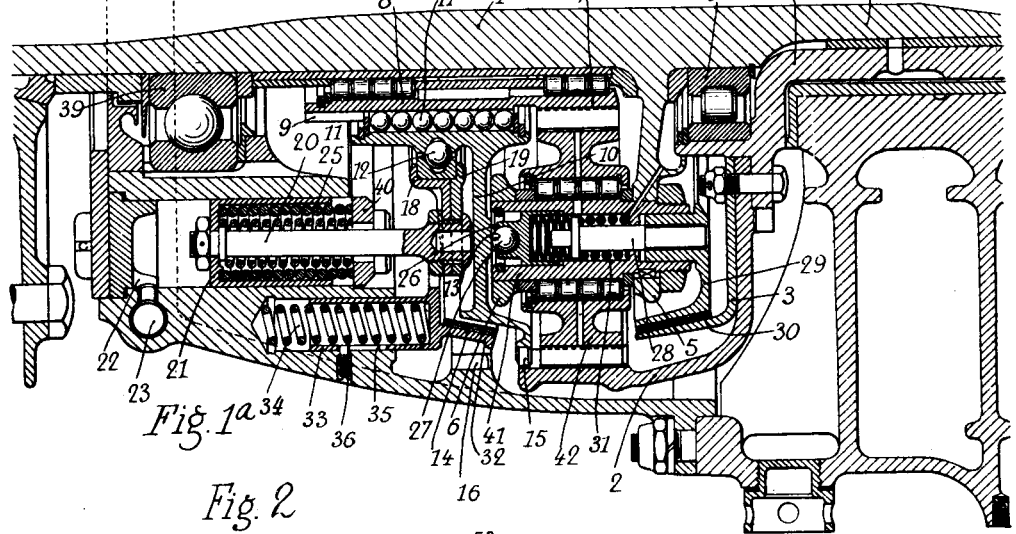

A preferred embodiment of the invention is shown in the accompanying drawings, wherein:

Fig. 1 is a longitudinal sectional view of the upper half of an epicyclic gear, showing the position of the parts at slow speed running.

Fig. 1ª is a longitudinal sectional view of the lower half of said epicyclic gear, showing the position of the parts for the direct drive.

Figure 2:
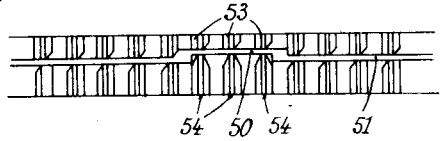

Fig. 2 shows in plan developed view a detail of the construction of the teeth of the intermediate member and annulus.

As shown in Fig. 1, 1 is the driving shaft, and 2 is a rotary internally toothed annulus which is secured at the end of said driving shaft; 3 is the outer clutch cone of a first clutch and is also secured to the end of said shaft; 4 denotes the driven propeller shaft; the spindles 41 of the planetary pinions 42 are supported at both ends by a disk 5 and a ring 6, integral with shaft 4.

Pinions 42 mesh on the one hand with annulus 2 and on the other hand with a central pinion 7, mounted loose on the propeller shaft 4 and supported by roller races separated by spacing members.

Pinion 7 has a hub 8 provided with flutes 9 by which it is rotatably connected with an intermediate axially movable member 10; for this purpose, said flutes 9 engage internal flutes formed in the hub 11 of member 10. The outer surface of hub 11 is provided with a ball race for a thrust ball bearing 12.

Member 10 also comprises a disc portion having a plane contact surface 13, a cone portion, provided with a suitable friction facing 14 forming the inner clutch cone of a second clutch, and a peripheral toothed portion 15, engaging a stationary toothed annulus 16 provided on the inner wall of the casing.

The intermediate member 10 may be shifted axially along the hub 8, and this sliding motion is facilitated by the provision of balls 17 located between the flutes 9 and the flutes of hub 11.

This sliding movement is controlled by hollow pistons 21, which may be six in number and are mounted in circular disposition around the driven shaft, and are slidable in cylinders 22 provided in the gear casing and adapted to be supplied, through a nib 24 and a pipe 23, with oil under pressure from an oil pump (not shown) driven by the engine. The motion of said pistons is imparted to a thrust plate 18 by rods 20 secured to said plate by nuts; said plate and a disc 19, secured thereto, clamp between them the thrust ball bearing 12 above referred to, whereby the motion of pistons 21 is transmitted to member 10.

Springs 25, located within pistons 21 and in contact with a ring 40 secured to the casing, are compressed in the movement of pistons 21 to the right (lower part of Fig. 1); when the oil pressure falls in chamber 22, the pistons automatically resume their position to the left (upper part of Fig. 1) under the tension of said springs.

The spindles 41 of the planetary pinions 42 are rigidly secured to disc 5 and each of them forms an inner race for rollers interposed between said spindles and the corresponding pinions. Within each spindle is slidable a small piston 26 provided with a ball 27 sprung in a recess thereof and projecting on its forward face. Concave spring washers are interposed between each piston 26 and a shoulder formed on a stud 28 which is adapted to engage a clutch cone 29, provided with a facing 30, when the spring washers are compressed in the movement of pistons 26 to the right, with the subsequent compression of springs 31 mounted between said shoulder and a shoulder on the inner surface of spindles 41. Clutch cone 29 is adapted to cooperate with the outer clutch cone 3 of shaft 1 and serves for the coupling on direct drive.

A clutch member 32, cooperating with the facing 14, mounted on the cone portion of the intermediate member 10, is connected with the casing by cylindrical hollow plungers 33 provided in a suitable number, and disposed upon a circle in bores of the casing. Springs 34, located within said plungers press upon the end wall of said bores.

A groove 35 is formed in the lateral wall of each plunger, and cooperates with a stud 36, screwed in the casing, to limit the axial displacement of clutch member 32. This latter in conjunction with clutch cone 14 of member 10 serves for the coupling at slow speed.

The propeller shaft 4 is fitted and centered within the hollow driving shaft by the tail portion 37 with the interposition of a roller bearing 38 at the rear, and it is further centered with respect to the casing by a thrust ball bearing 39 at the front.

The operation is as follows:

In the case of the drive at slow speed (upper part of Fig. 1), the supply of oil under pressure to pipe 23 is cut off. Pistons 21 are urged to the left by springs 25. The cone portion of the intermediate member 10 engages clutch member 32, and its gear teeth 15 mesh with the stationary annulus 16 of the casing; hence said member 10 is held stationary and pinion 7 is held in a fixed position by means of the flutes 9, and the flutes of hub 11.

Clutch 3, 29, is unclutched. The gear operates as an epicyclic speed-reducing device of the well known type.

In this condition, the speed of the propeller is a function of the reduction ratio of the gearing.

To proceed to the second position, or direct drive position, (Fig. 1ª) the teeth 15 of member 10 are caused to mesh with annulus 2.

For this purpose, oil under pressure is supplied through nib 24 and pipe 23 to cylinders 22. Pistons 21 are driven to the rear against the action of springs 25. Rods 20 shift disk 18 to the right, whereby member 10 is moved to the right, through the medium of the thrust bearing 12.

Springs 34 allow the clutch member 32 to follow this displacement of member 10, and this is a necessary feature, since, when the teeth 15 are released from annulus 16, member 10 and hence the propeller would run loose. It will be seen that, when the teeth 15 are disengaged from annulus 16, the direct drive does not yet take place; member 10 is however held against rotation by clutch 14—32.

The oil pressure still acting on pistons 21, shifts them to their outermost position and the flat portion 13 engages the balls 27, thus moving pistons 26 to the right, and, as the spring washers are stiffer than springs 31, the latter will be compressed and actuate the studs 28 which, after a certain stroke, will bring the clutch members 29—3 into engagement and thus secure a rigid connection between disc 5 and disc 2.

At this time, the other clutch 14—32, is released due to the limited stroke of plungers 33, but the propeller shaft now begins to be driven by means of the clutch 29—3 due to the elastic connection with the driving shaft.

The clutch device 3—30 being in the clutching position, member 29 is prevented from moving further to the right, so that the spring washers are compressed by reason of the further movement of pistons 26, thus allowing the teeth 15 to engage the toothed annulus 2.

At this time the parts controlling the axial movement of member 32 (plungers 33 and pistons 21) will have been moved through their maximum stroke. Clutch 14—32 is released, and member disc 32 is held by studs 36. Member 10 is now locked in rotation with disc 2 mounted on the crankshaft, thus driving pinion 7 at the engine speed; the propeller shaft will be actuated on direct drive, the planetary pinions being held fast between disc 2 and pinion 7.

It is advantageous, in order to provide for a smooth engagement of member 10, either with annulus 2 or with annulus 16, to slow up the engine speed during the speed changing operation. Since the necessary movements are controlled by the oil pressure acting on pistons 21, the means for controlling the slow speed may be coupled with the means for controlling the oil pressure in conduit 23 by any suitable mechanism.

As soon as the teeth 15 of member 10 engage annulus 2, the engine may be allowed to again operate under full load.

In Figure 2, it will be noted that the shape of the teeth 15 and of the teeth of annulus 2 is such that only a few teeth will come first into engagement in order to facilitate said engagement. For this purpose, the clearance between said teeth at 50 is smaller than the clearance at 51, so that the three teeth 54 will engage the teeth 53 before the other teeth make contact.

In order to effect the movement of member 10 for the direct drive, the oil pressure on pistons 21 should remain constant. If this pressure is willingly or accidentally reduced, pistons 21 will be urged back by their springs 23 and will shift member 10 to the left, thus releasing its teeth from the annulus 2. The clutch device 3—30 is now released, and the intermediate member 10 becomes loose for a very short time. It possesses a great inertia in direct drive, since its speed is equal to the speed of the engine.

Before member 10 engages the stationary toothed annulus 16 of the casing, its motion must therefore be braked. This braking effect is obtained by the clutch 14, 32, which, at this time, assumes its outermost position to the right, under the action of springs 34, and hence member 10 will engage cone 32 and will be braked thereby before the teeth 15 engage the annulus 16; the smooth operation of the gear will depend upon the relative strength of the springs 34 and 25. In this manner the gear is returned to the first position above described for the drive at slow speed without shocks.

Obviously, the invention is not limited to the form of construction herein specified.

Although the displacement of member 10 is controlled by the oil pressure furnished by the engine, in the preceding description, it is clear that the control may be effected by any other suitable means, such as the pressure of the exhaust gas, or other means of a mechanical nature may be provided.

Having now described my invention what I claim as new and desire to secure by Letters Patent is:

1. In a speed reducing gear, particularly adapted for aeroplane engines, the combination of a driving shaft, a rotary annulus rotatable with said shaft, a driven shaft, a pinion mounted loose on said driven shaft, hollow spindles supported from said driven shaft, planetary pinions loose on said spindles, respectively, and meshing with said loose pinion, a casing, a stationary annulus rigid with said casing, an axially movable member having teeth adapted for engagement either with said rotary annulus or with said stationary annulus according to its axial position, means for slidably connecting said member with said pinion, a first clutch member associated with said driving shaft, a second clutch member adapted to cooperate with said first clutch member, and thrust transmitting means extending through said hollow spindles, adapted to be engaged by said axially movable member before the latter engages said rotary annulus to move said second clutch member toward said first clutch member.

2. A speed reducing gear as claimed in claim 1, wherein said thrust transmitting means include resilient means adapted to yieldingly press said second clutch member against said first clutch member.

3. A speed reducing gear as claimed in claim 1, wherein said thrust transmitting means include a number of studs respectively located in said hollow spindles and mounted at one end in said second clutch member, and, for each stud, a piston slidable in said hollow spindle, a ball projecting from the outer surface of said piston adjacent said axially movable member, spring means between said piston and said stud and spring means adapted to counteract the axial displacement of said stud toward the clutching position, said first-mentioned spring means being stiffer than said last-mentioned spring means.

4. In an epicyclic speed reducing gear, particularly adapted for aeroplane engines, the combination of a driving shaft, a rotary annulus rotatable with said shaft, a driven shaft, planetary pinions supported from said shaft and meshing with said annulus, a pinion loosely mounted on the driven shaft and meshing with said planetary pinions, a casing, a movable member adapted to operatively connect said loose pinion with said casing in a first position and to operatively connect said loose pinion with said driving shaft in a second position, clutch means between said driving shaft and said driven shaft and control means, actuated by the movement of said movable member for clutching said clutch means before said member reaches said second position.

5. In an epicyclic speed reducing gear, particularly adapted for aeroplane engines, the combination of a driving shaft, a rotary annulus rotatable with said shaft, a driven shaft, planetary pinions supported from said shaft and meshing with said annulus, a pinion loosely mounted on the driven shaft and meshing with said planetary pinions, a casing, a movable member adapted to operatively connect said loose pinion with said casing in a first position and to operatively connect said loose pinion with said driving shaft in a second position, movable clutch means having a smaller stroke than said movable member for temporarily coupling said member with said casing and means for releasing said clutch means at the end of the stroke thereof.

6. In an epicyclic speed reducing gear, particularly adapted for aeroplane engines, the combination of a driving shaft, a rotary annulus rotatable with said shaft, a driven shaft, planetary pinions supported from said shaft and meshing with said annulus, a pinion loosely mounted on the driven shaft and meshing with said planetary pinions, a casing, a movable member adapted to operatively connect said loose pinion with said casing in a first position and to operatively connect said loose pinion with said driving shaft in a second position, a pressure influenced member, means for establishing a controllable fluid pressure on said last-mentioned member, and means for connecting said last-mentioned member with said movable member.

7. In an epicyclic speed reducing gear particularly adapted for aeroplane engines, the combination of a driving shaft, a rotary annulus rotatable with said shaft, a driven shaft, planetary pinions supported from said driven shaft and meshing with said annulus, a pinion loosely mounted on the driven shaft, and meshing with said planetary pinions, a casing, a stationary annulus rigid with said casing, an axially movable member having teeth adapted for engagement either with said rotary annulus or with said stationary annulus according to its axial position, means for slidably connecting said member with said pinion, a fluid pressure pipe, a number of cylinders in communication with said pipe, a piston movable in each of said cylinders and a thrust member operatively connected with said pistons and rotatably mounted on said axially movable member for transmitting axial thrust thereto.

8. In an epicyclic speed reducing gear particularly adapted for aeroplane engines, the combination of a driving shaft, a rotary annulus rotatable with said shaft, a driven shaft, planetary pinions supported from said driven shaft and meshing with said annulus, a pinion loosely mounted on the driven shaft, and meshing with said planetary pinions, a casing, a stationary annulus rigid with said casing, an axially movable member having teeth adapted for engagement either with said rotary annulus or with said stationary annulus according to its axial position, means for slidably connecting said member with said pinion, a first clutch member associated with said axially movable member, a second clutch member adapted to cooperate with said first clutch member, means for slidably connecting said second clutch member with said casing, resilient means for urging said second clutch member toward said first clutch member and means for limiting the axial displacement of said second clutch member under the action of said resilient means.

9. In an epicyclic speed reducing gear particularly adapted for aeroplane engines, the combination of a driving shaft, a rotary annulus rotatable with said shaft, a driven shaft, planetary pinions supported from said driven shaft and meshing with said annulus, a pinion loosely mounted on the driven shaft, and meshing with said planetary pinions, a casing, a stationary annulus rigid with said casing, an axially movable member having teeth adapted for engagement either with said rotary annulus or with said stationary annulus according to its axial position, means for slidably connecting said member with said pinion, a first clutch member associated with said axially movable member, a second clutch member adapted to cooperate with said first clutch member, cylindrical hollow plungers rigid with said second clutch member and slidable in bores of said casing, springs within said plungers and bores, respectively, a groove in the cylindrical surface of each of said plungers, and a projection on the inner wall of each bore, engaging the corresponding groove.

10. In an epicyclic speed reducing gear, particularly adapted for aeroplane engines, the combination of a driving shaft, a rotary annulus rotatable with said shaft, a driven shaft, planetary pinions supported from said shaft and meshing with said annulus, a pinion loosely mounted on the driven shaft and meshing with said planetary pinions, a casing, a movable member adapted to operatively connect said loose pinion with said casing in a first position and to operatively connect said loose pinion with said driving shaft in a second position, braking means in the path of said movable member toward said first position and means for yieldingly connecting said braking means with said casing.

11. In an epicyclic speed reducing gear particularly adapted for aeroplane engines, the combination of a driving shaft, a rotary annulus rotatable with said shaft, a driven shaft, planetary pinions supported from said driven shaft and meshing with said annulus, a pinion loosely mounted on the driven shaft, and meshing with said planetary pinions, a casing, a stationary annulus rigid with said casing, an axially movable member having teeth adapted for engagement either with said rotary annulus or with said stationary annulus according to its axial position, means for slidably connecting said member with said pinion, a number of teeth of said movable member projecting laterally toward said rotary annulus with respect to the remaining teeth of said movable member.

12. In an epicyclic speed reducing gear particularly adapted for aeroplane engines, the combination of a driving shaft, a rotary annulus rotatable with said shaft, a driven shaft, planetary pinions supported from said driven shaft and meshing with said annulus, a pinion loosely mounted on the driven shaft, and meshing with said planetary pinions, a casing, a stationary annulus rigid with said casing, an axially movable member having teeth adapted for engagement either with said rotary annulus or with said stationary annulus according to its axial position, means for slidably connecting said member with said pinion, a fluid pressure pipe, a number of cylinders in communication with said pipe, a piston movable in each of said cylinders, a thrust member operatively connected with said pistons and a thrust ball bearing for rotatably connecting said thrust member with said axially movable member and transmitting axial thrust from one to the other.

In testimony whereof I have signed my name to this specification.

MARIUS JEAN-BAPTISTE BARBAROU.